United States Patent
Sagara

(10) Patent No.: US 8,595,730 B2
(45) Date of Patent: Nov. 26, 2013

(54) INFORMATION PROCESSING SYSTEM AND STORAGE MEDIUM

(75) Inventor: Naoki Sagara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1371 days.

(21) Appl. No.: 12/052,873

(22) Filed: Mar. 21, 2008

(65) Prior Publication Data

US 2008/0244591 A1    Oct. 2, 2008

(30) Foreign Application Priority Data

Apr. 2, 2007    (JP) .................................. 2007-096031

(51) Int. Cl.
*G06F 9/46*    (2006.01)

(52) U.S. Cl.
USPC ........................................... 718/102; 718/100

(58) Field of Classification Search
USPC ........................... 718/100, 101, 102, 103, 104
See application file for complete search history.

(56) References Cited

U.S. PATENT DOCUMENTS

| | | | | |
|---|---|---|---|---|
| 6,049,801 | A * | 4/2000 | Whitmyer, Jr. | 1/1 |
| 7,146,565 | B2 * | 12/2006 | Toyama et al. | 715/239 |
| 2001/0051935 | A1 * | 12/2001 | Sugiura | 706/12 |
| 2004/0066924 | A1 * | 4/2004 | Wertsberger | 379/201.01 |
| 2005/0177532 | A1 * | 8/2005 | Desbiens | 707/1 |
| 2007/0192423 | A1 * | 8/2007 | Karlson | 709/206 |
| 2007/0214218 | A1 * | 9/2007 | Ward et al. | 709/205 |
| 2007/0234201 | A1 * | 10/2007 | Fukura et al. | 715/513 |

FOREIGN PATENT DOCUMENTS

| | | |
|---|---|---|
| JP | 7193595 | 7/1995 |
| JP | 2001331599 | 11/2001 |
| JP | 2003108726 | 4/2003 |

* cited by examiner

*Primary Examiner* — Emerson Puente
*Assistant Examiner* — Willy W Huaracha
(74) *Attorney, Agent, or Firm* — Gesmer Updegrove LLP

(57) ABSTRACT

An information processing system has a file memory, a schedule information memory, a reminder information memory that stores reminder information including identification information of a user, a registration deadline of the first electronic file, and a reminder submission time in connection with information indicating a registration location of the first electronic file in the file memory, a setting unit that specifies, upon arrival of the reminder submission time, a schedule item for reminding the user of the task in schedule information of the user stored in the schedule information memory as an item scheduled for the registration deadline or schedule for a day prior to the registration deadline, and a display data outputting unit that outputs, upon receipt of a request for displaying the schedule information, schedule information display data in which display information corresponding to the schedule item is associated with information on a link to the registration location.

4 Claims, 8 Drawing Sheets

SETTING EXAMPLE OF REGISTRATION REMINDER INFORMATION ASSOCIATED WITH FOLDER F

| USER/GROUP NAME | DOCUMENT TITLE | REMINDER SUBMISSION DATE AND TIME | REGISTRATION DEADLINE |
|---|---|---|---|
| USER A USER B | REPORT | 2007/03/27 15:00 | 2007/03/30 17:00 |
| USER C GROUP G1 | INFORMATIVE MEMO | 2007/03/28 17:00 | 2007/03/30 12:00 |
| | | | |

(A) SCHEDULE TABLE FOR USER A (WEEKLY DISPLAY)

| 3/26(MON) | 3/27(TUE) | 3/28(WED) | 3/29(THU) | 3/30(FRI) | 3/31(SAT) | 4/1(SUN) |
|---|---|---|---|---|---|---|
|  | 13:00~17:00 PATENT SEMINAR | 15:00~17:00 PRELIMINARY DISCUSSION | 11:00~12:00 MEETING |  |  |  |

Fig. 4A (B) SCHEDULE TABLE FOR USER B (WEEKLY DISPLAY)

| 3/26(MON) | 3/27(TUE) | 3/28(WED) | 3/29(THU) | 3/30(FRI) | 3/31(SAT) | 4/1(SUN) |
|---|---|---|---|---|---|---|
|  | ALL-DAY BUSINESS TRIP | ALL-DAY BUSINESS TRIP | 14:00~15:00 MEETING | 15:00~17:00 PRELIMINARY DISCUSSION |  |  |

Fig. 4B (A) SCHEDULE TABLE FOR USER A (WEEKLY DISPLAY)

| 3/26(MON) | 3/27(TUE) | 3/28(WED) | 3/29(THU) | 3/30(FRI) | 3/31(SAT) | 4/1(SUN) |
|---|---|---|---|---|---|---|
|  | 13:00~17:00 PATENT SEMINAR | 15:00~17:00 PRELIMINARY DISCUSSION | 11:00~12:00 MEETING | 17:00 REGISTER REPORT ← 51 |  |  |

Fig. 6A (B) SCHEDULE TABLE FOR USER B (WEEKLY DISPLAY)

| 3/26(MON) | 3/27(TUE) | 3/28(WED) | 3/29(THU) | 3/30(FRI) | 3/31(SAT) | 4/1(SUN) |
|---|---|---|---|---|---|---|
| 16:34 REPORT REGISTERED ← 52 | ALL-DAY BUSINESS TRIP | ALL-DAY BUSINESS TRIP | 14:00~15:00 MEETING | 15:00~17:00 PRELIMINARY DISCUSSION |  |  |

Fig. 6B

SETTING EXAMPLE OF REVISION REMINDER INFORMATION
ASSOCIATED WITH "DOCUMENT D"

| USER/GROUP NAME | DOCUMENT TITLE | REMINDER SUBMISSION DATE AND TIME | REVISION DEADLINE |
|---|---|---|---|
| USER A | DOCUMENT D | 2007/03/27 15:00 | 2007/03/30 17:00 |
| | | | |

SCHEDULE TABLE FOR USER A (WEEKLY DISPLAY)

| 3/26(MON) | 3/27(TUE) | 3/28(WED) | 3/29(THU) | 3/30(FRI) | 3/31(SAT) | 4/1(SUN) |
|---|---|---|---|---|---|---|
| | 13:00~17:00 PATENT SEMINAR | 15:00~17:00 PRELIMINARY DISCUSSION | 11:00~12:00 MEETING | 17:00 REVISE DOCUMENT D ← 54 | | |

Fig. 10

SCHEDULE TABLE FOR USER A (WEEKLY DISPLAY)

| 3/26(MON) | 3/27(TUE) | 3/28(WED) | 3/29(THU) | 3/30(FRI) | 3/31(SAT) | 4/1(SUN) |
|---|---|---|---|---|---|---|
| 18:33 DOCUMENT D REVISED ← 55 | 13:00~17:00 PATENT SEMINER | 15:00~17:00 PRELIMINARY DISCUSSION | 11:00~12:00 MEETING | | | |

US 8,595,730 B2

INFORMATION PROCESSING SYSTEM AND STORAGE MEDIUM

CROSS-REFERENCE TO RELATED APPLICATIONS

This application is based on and claims priority under 35 USC 119 from Japanese Patent Application No. JP 2007-96031 filed on Apr. 2, 2007.

BACKGROUND

1. Technical Field

The present invention relates to an information processing system and a storage medium.

2. Related Art

Various reminding techniques have been suggested to ensure that a person in charge reliably accomplishes a task of registering or revising an electronic document by a predetermined deadline.

SUMMARY

The present invention has characteristic features of having a file memory that stores an electronic file, a schedule information memory that stores schedule information for each user, a reminder information memory that stores reminder information including identification information of a user who takes on a task of registering a first electronic file into the file memory, a registration deadline of the first electronic file, and a reminder submission time at which the user who takes on the task is reminded to accomplish the task in connection with information indicating a registration location of the first electronic file in the file memory, a setting unit that specifies, upon arrival of the reminder submission time, a schedule item for reminding the user of the task in schedule information of the user stored in the schedule information memory as an item scheduled for the registration deadline or scheduled for a day prior to the registration deadline depending on whether or not the user who takes on the task accomplishes the task, and a display data outputting unit that outputs, upon receipt of a request for displaying the schedule information stored in the schedule information memory, schedule information display data in which display information corresponding to the schedule item specified by the setting unit is associated with information on a link to the registration location.

BRIEF DESCRIPTION OF THE DRAWINGS

Exemplary embodiments of the present invention will be described in detail based on the following figures, wherein:

FIG. 3 shows a setting example of registration reminder information according to the first exemplary embodiment;

FIG. 4A shows a screen display example of a schedule table for a user A prior to a reminder submission date and time according to the first exemplary embodiment;

FIG. 4B shows a screen display example of the schedule table for a user B prior to the reminder submission date and time according to the first exemplary embodiment;

FIG. 6A shows a screen display example of the schedule table for the user A after the reminder submission date and time according to the first exemplary embodiment;

FIG. 6B shows a screen display example of the schedule table for the user B after the reminder submission date and time according to the first exemplary embodiment;

FIG. 7 shows a setting example of revision reminder information according to a second exemplary embodiment of the present invention;

FIG. 9 shows a screen display example of the schedule table for a user who has not accomplished the revision task at the time when the reminder submission date and time arrives according to the second exemplary embodiment; and FIG. 10 shows a screen display example of the schedule table for a user who has accomplished the revision task at the time when the reminder submission date and time arrives according to the second exemplary embodiment.

DETAILED DESCRIPTION

Exemplary embodiments of the present invention will be described below with reference to the drawings.

Exemplary Embodiment 1

Figure 1:
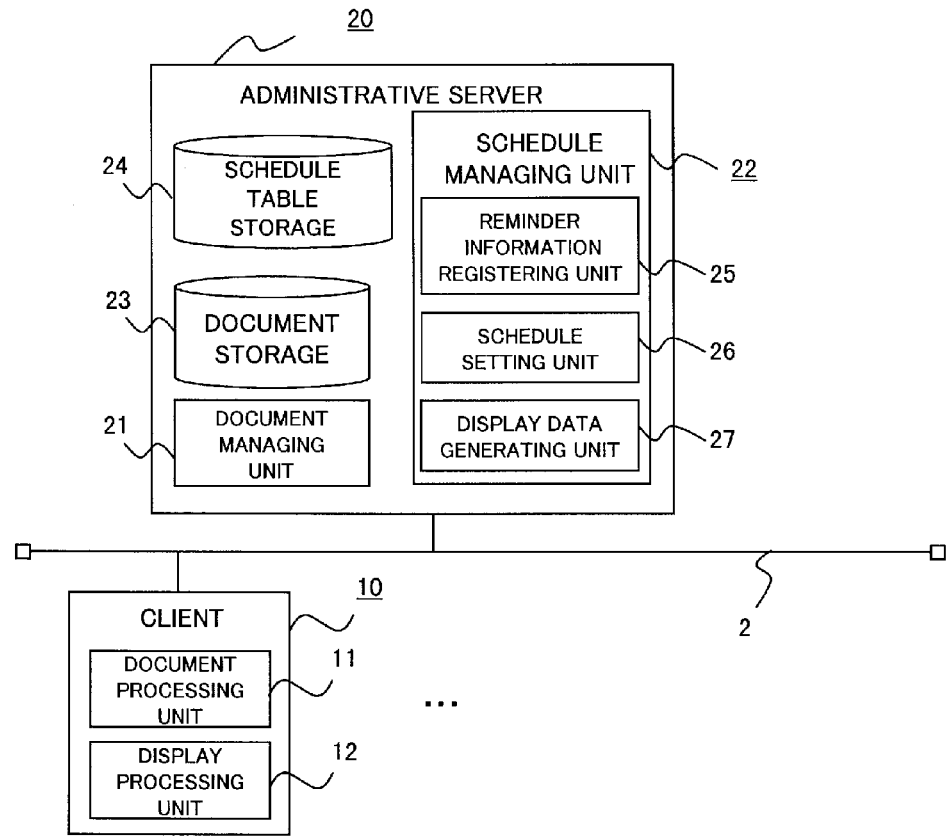
FIG. 1 is an example of a block diagram showing one form of an information processing system according to the present invention.

FIG. 1 is an example of a block diagram showing one form of an information processing system according to the present invention. In the information processing system according to a first exemplary embodiment of the present invention, an administrative server 20 used for document management and schedule management is connected via a network 2 to multiple clients 10 used by users. It should be noted that all the clients 10 may have the same configuration, and only one of the clients 10 is shown in FIG. 1.

Figure 2:
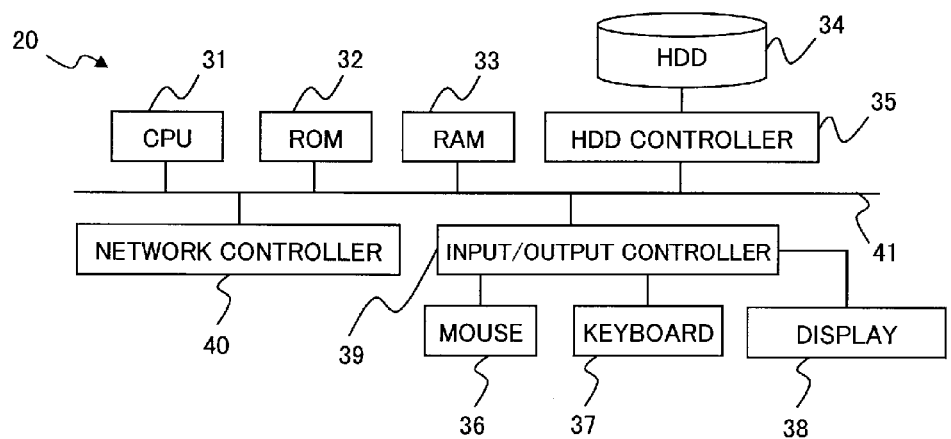
FIG. 2 shows an example of a hardware configuration of a server computer that constitutes an administrative server according to a first exemplary embodiment of the present invention.

FIG. 2 shows an example of a hardware configuration of a server computer that constitutes the administrative server 20 according to Exemplary Embodiment 1. The server computer may be implemented using a conventional general-purpose hardware configuration. More specifically, the server computer has a configuration in which a CPU 31, a ROM 32, a RAM 33, a HDD controller 35 to which a hard disk drive (HDD) 34 is connected, an input/output controller 39 to which a mouse 36 and a keyboard 37 both provided as an input unit and a display 38 (which may be, for example, a liquid crystal display) are respectively connected, and a network controller 40 (which may be, for example, a network interface card) mounted as a communication unit are connected via an internal bus 41.

The client 10 may be implemented by, for example, a general-purpose personal computer (PC). Although there might be a difference in performance capabilities between the client 10 and the server computer, the client 10 is a computer as well, and has a hardware configuration which can be illustrated similarly to the hardware configuration shown in FIG. 2. Therefore, the hardware configuration of the client 10 is not described here, and FIG. 2 is also used for the description regarding the hardware configuration of the client 10.

Returning to FIG. 1, each functional block of the computers 10 and 20 will be described below. The client 10 has a document processing unit 11 and a display processing unit 12. The document processing unit 11 performs an edit processing such as a revision on an electronic document managed in the administrative server 20, or performs processing associated with electronic documents such as registration of an electronic document into the administrative server 20. The document processing unit 11 cooperatively functions with a document managing unit 21 in the administrative server 20 to enable exclusive editing of the electronic document managed in the administrative server 20. The display processing unit 12 for performing the displaying onto the display 38 displays information received from the administrative server 20, such as, for example, a schedule table for a user who is using a corresponding client managed by the administrative server 20 on a screen (the display 38).

Each of the document processing unit 11 and the display processing unit 12 in the client 10 is implemented, for example, by a PC which is caused to function as each processing unit by a program stored in the HDD 34. In a specific example, the document processing unit 11 is implemented by the PC which is caused to function as the document processing unit 11 by a document edit application. Further, the display processing unit 12 is implemented by the PC which is caused to function as the display processing unit 12 by a display software program. Further, the schedule table for each user is read out from the administrative server 20 and displayed on the screen by means of, for example, a browser function installed in the PC.

On the other hand, the administrative server 20 includes the document managing unit 21, a schedule managing unit 22, a document storage 23, and a schedule table storage 24. For example, a hard disk may be used for the document storage 23 and the schedule table storage 24. The document managing unit 21 performs management of electronic documents stored in the system, such as, a document registration processing for registering a document into the document storage 23 in response to a registration request from the client, and document edit processing including readout of a requested document or update of registered contents to an edited electronic document in response to a request for referencing or editing the electronic document stored in the document storage 23. In particular, when an edit task is performed, the document managing unit 21 functions to implement check-in/check-out of an electronic document, thereby enabling a user to exclusively edit the electronic document. The schedule managing unit 22 uses the schedule table provided for each user in the form of electronic data to manage a schedule on a user-by-user basis. The schedule table is stored in the schedule table storage 24. Basic functions of schedule management supplied from the schedule managing unit 22 can be implemented using already-existing functions. In addition to the basic functions, characteristic functions according to this exemplary embodiment which will be described below are incorporated into the schedule managing unit 22. The incorporated characteristic functions are implemented by a reminder information registering unit 25 and a schedule setting unit 26. Among them, the reminder information registering unit 25 according to this exemplary embodiment establishes document registration reminder information for reminding a user of electronic document registration and associates the document registration reminder information with a document storage location, such as, for example, a folder. The document registration reminder information established by the reminder information registering unit 25 includes, as described below, a date and time at which a reminder of the electronic document registration is submitted. Then, depending on an electronic file registration state of each user when the date and time at which the reminder is submitted arrives, the schedule setting unit 26 specifies a schedule item for reminding the user to register the electronic document onto the schedule table of the user. Further, upon receipt of a request for displaying the schedule table from the client 10, a display data generating unit 27 generates display data of the schedule table in which display information corresponding to the schedule item specified by the schedule setting unit 26 is associated with information on a link to a storage location in which the electronic document is stored, and sends the generated display data to the client 10. Although it has been described in this exemplary embodiment that the reminder information registering unit 25, the schedule setting unit 26, and the display data generating unit 27 are incorporated into the schedule managing unit 22, the reminder information registering unit 25, the schedule setting unit 26, and the display data generating unit 27 may be incorporated into a unit other than the schedule managing unit 22 as long as the unit is mounted in the administrative server 20. In this case, it is necessary for the schedule managing unit 22 to be able to exchange information with the reminder information registering unit 25, the schedule setting unit 26, and the display data generating unit 27. In addition, although the date and time is specified as the time to submit the reminder, a date in month-day format, for example, may be specified.

Each of the document managing unit 21 and the schedule managing unit 22 in the administrative server 20 is implemented, for example, by the administrative server 20 which is caused to function as each processing unit by a program stored in the HDD 34. In addition, the document storage 23 and the schedule table storage 24 are realized by, for example, the HDD 34 mounted in the administrative server 20. It is, of course, possible to implement the document storage 23 and the schedule table storage 24 using the RAM 33.

The program that realizes the characteristic processing functions according to this exemplary embodiment may be installed in the administrative server 20. In other words, the client 10 is implementable using an existing hardware configuration and software programs. Further, the administrative server 20 is also implementable using the existing hardware configuration. It should be noted that although the document management and the schedule management are performed in the single administrative server 20 in this exemplary embodiment, different server computers may be configured to independently perform the document management and the schedule management.

The programs used in this exemplary embodiment may, of course, be supplied via a communication apparatus, or may be supplied from a computer readable recording medium, such as a CD-ROM or a DVD-ROM, in which the programs are stored. The programs supplied from the communication apparatus or the recording medium are installed in a computer, and the CPU 31 in the computer executes the installed programs in sequence to implement each processing unit.

In order to realize operation according to this exemplary embodiment, it is necessary for registration reminder information to be previously registered. A setting example of the registration reminder information is shown in FIG. 3. The registration reminder information includes items associated with a task of registering an electronic document. In this exemplary embodiment, the reminder information registering unit 25 generates the registration reminder information according to a user instruction, and registers the generated registration reminder information in connection with a folder that functions as a registration location of the electronic document to be registered. As shown in FIG. 3, the registration reminder information contains data items of a user/group name, a document title, a reminder submission date and time, and a registration deadline. In the user/group name, at least one user/group name is specified as identification information of a user who takes on the task of registering electronic documents (a user who is assigned to accomplish the electronic document registration task). In the document title, a document name used for registering an electronic document into the folder associated with the electronic document is specified. When multiple users are assigned to accomplish the electronic document registration task, it is obviously necessary for electronic documents to be registered according to a predetermined rule, such as addition of a unique character string to the document title or creation of sub folders, in order to prevent the previously registered electronic documents from being lost due to overwriting. In the registration deadline, a deadline for registration of the electronic document is specified. In the reminder submission date and time, a date and time at which a user who has not registered the electronic document is reminded to register the document is specified.

When a person, such as a document manager or a task manager, inputs from a predetermined input screen the user/group name, the document title, the reminder submission date and time, the registration deadline, and the folder in which the electronic document is registered, the reminder information registering unit 25 accepts the input data. Then, the reminder information registering unit 25 generates, from the input data, the registration reminder information having the data structure shown in FIG. 3, and stores the generated registration reminder information in connection with the designated folder in the document storage 23.

In this exemplary embodiment, because the registration reminder information is associated with the folder to be registered, the registration reminder information is stored in the document storage 23. However, it is not limited to this configuration, and another unit may be provided to store the registration reminder information.

In addition, because the reminder submission date and time represents a time of reminding the user who has not registered the electronic document to perform the registration, a date and time prior to the registration deadline is always specified as the reminder submission date and time. Accordingly, a predetermined initial value, such as, for example, 3 days ahead of an established registration deadline, may be preset to the reminder submission date and time, and the initial value may be established as the reminder submission date and time automatically without requesting a user to input a value of the reminder submission date and time, or automatically established when no value is input to the submission date and time by the user. In addition, when the user who performs the registration is allowed to determine a desired document tile at the time of registration of the electronic document, the registration reminder information does not have to contain the document title.

Here, an example of a flow of processing performed until the schedule table is displayed on the screen is briefly described.

Initially, a user inputs a user ID from any one of the clients 10 to log in the system, and starts up a browser. The user's own schedule table is displayed on the screen automatically in response to the start up of the browser, or displayed through a predetermined user operation subsequent to the start up of the browser. More specifically, upon receipt of a schedule table transmission request including the user ID from the browser installed in the client 10, the schedule managing unit 22 in the administrative server 20 retrieves the schedule table of the user from the schedule table storage 24, generates display data for the retrieved schedule table, and sends the generated display data to the client 10 from which the request is sent. The display data may be generated, for example, as an HTML document. As a result, the schedule table of the user is displayed on the screen through the browser. Screen display examples showing schedule tables for users A and B prior to the reminder submission date and time are illustrated in FIGS. 4A and 4B, respectively.

Figure 5:
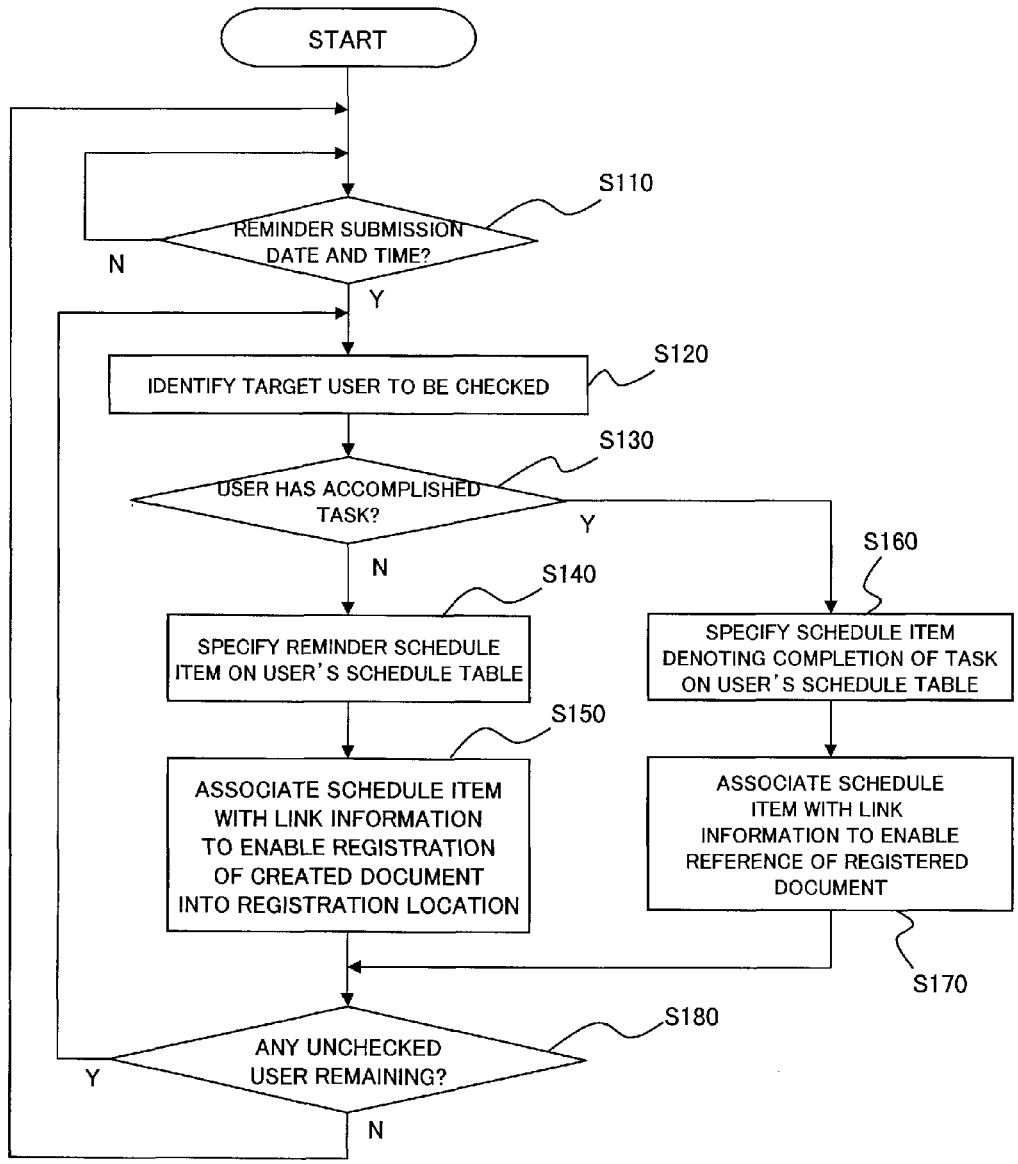
FIG. 5 is a flowchart showing an example of reminder processing for an electronic document registration task according to the first exemplary embodiment.

Next, an example of reminder processing to remind a user of the electronic document registration task according to this exemplary embodiment will be described with reference to a flowchart shown in FIG. 5. This processing is mainly performed by the schedule setting unit 26.

The schedule setting unit 26 operates at all times to continuously compare a present time with a set value of the reminder submission date and time contained in each set of registration reminder information. Although it is preferable that the schedule setting unit 26 is always active, the schedule setting unit 26 may be activated, for example, at regular time intervals. When the present time reaches any reminder submission date and time (when yes is determined in step 110), the schedule setting unit 26 recognizes a registration reminder information set that contains the reached reminder submission date and time. In the setting example of FIG. 3, when the present time reaches 15:00 Mar. 27, 2007, the schedule setting unit 26 recognizes a registration reminder information set 50 which is located at the top in a record associated with a predetermined folder ("folder F" in the example of FIG. 3). Then, users specified in the user/group name of the registration reminder information set 50 are sequentially identified as a target user to be checked (step 120). In this example, the users A and B are identified in succession as the target user to be checked. Here, it is assumed that the user B has already accomplished registration, while the user A has not registered the electronic document, and based on this assumption, the description regarding the remind processing is continued below.

The user A is initially recognized as the target user to be checked. The schedule setting unit 26 examines a creator of a document having a document name of "report" registered in the folder F to find whether or not the user A has registered the electronic document. When it is determined that the user A has not registered the electronic document (when no is determined in step 130), the schedule setting unit 26 specifies a schedule item 51 denoting, for example, "17:00 Register Report" as an item scheduled to remind the user of registration at the date and time "17:00 Mar. 30, 2007" corresponding to the registration deadline on the schedule table of the user A (step 140). Consequently, the schedule table on which a schedule for report registration is incorporated in a column at the date and time of the registration deadline is displayed on the screen as shown in FIG. 6A as long as the user A does not accomplish the registration even after the reminder submission date and time has passed. Further, the schedule setting unit 26 associates the incorporated schedule item 51 with information on a link to the folder F designated as the registration location of the electronic document. Here, the schedule setting unit 26 may associate the incorporated schedule item 51 with link information in which it is defined that a predetermined document edit application is invoked to enable creation of a new electronic document, and that the created new electronic document is stored in the folder F designated as the registration location (step 150). It may be further defined that the created new electronic document is stored using the specified document title "report". In the above-described example, the registration reminder information in which the document title is specified has been described. However, in a case where the registration reminder information includes neither document title nor settings of the document title, the creators of all electronic documents registered in the folder F may be examined to determine whether or not the electronic document created by the user A is present in the folder F. Then, based on the presence or absence of the electronic document created by the user A, whether or not the user A has registered the electronic document may be determined. Then, when the schedule item is established, a schedule item denoting, for example, "17:00 Register Document" or "17:00 Register Document into Folder F" may be specified. Further, although the schedule item for reminding the user A to register the electronic document is specified as an item scheduled for the date and time corresponding the registration deadline in the above-described example, the schedule item may be specified as an item scheduled for a date and time existing between the reminder submission date and time and the registration deadline. For example, when the user A is scheduled to have a day off on a day of the registration deadline, the schedule item may be specified on the day before the registration deadline.

Then, the schedule setting unit 26 moves to step 120 when any unchecked user remains (when yes is determined in step 180). On the other hand, when there is no unchecked user (when no is determined in step 180), the schedule setting unit 26 terminates processing of the registration reminder information set 50 and starts processing of another registration reminder information set including a next closer reminder submission date and time (step 110). In this example, the schedule setting unit 26 moves to step 120 for examining the user B as the target user to be checked.

The schedule setting unit 26 checks the creator of the document having the document name of "report" registered in the folder F to find whether or not the user B has already registered the electronic document. When registration of the electronic document by the user B is found (when yes is determined in step 130), the schedule setting unit 26 reads out data on a document created date and time from attribute information of the registered electronic document. Here, if the document created date and time is assumed to be 16:34 Mar. 26, 2007, the schedule setting unit 26 specifies a schedule item 52 denoting "16:34 Report Registered" as a schedule item representing completion of document registration in a column of the document created date and time "16:34 Mar. 26, 2007" on the schedule table of the user B (step 160). As a result, as long as the user B has accomplished the document registration by the reminder submission date and time, the schedule table on which the schedule item representing the completion of report registration is incorporated in the column of the document created date and time is displayed on the screen as illustrated in FIG. 6B. It should be noted that the item incorporated by the processing in step 160, which is actually a real accomplishment, is described as "the schedule item representing the completion of report registration" because the item is displayed on the schedule table. Although the schedule setting unit 26 specifies the schedule item representing the completion of document registration as the item scheduled for the electronic document created date and time in the above-described example, a time when the electronic document is registered may be incorporated into attribute information of the electronic document, to thereby enable a setting of the schedule item representing the completion of document registration as an item scheduled for the time when the electronic document is registered.

Further, the schedule setting unit 26 associates the incorporated schedule item 52 with link information in which it is defined that the predetermined document edit application is invoked to enable review of the created electronic document or the editing of the created electronic document as needed (step 170). With this configuration, upon displaying the schedule table, the user B is able to confirm that the task of report registration is accomplished. Then, when the user B wants to review or edit the contents of the registered report while displaying the schedule table, all the operation the user B needs is a selection operation, such as a click, of "16:34 Report Registered" on the schedule table. Although the schedule item representing the completion of document registration is specified on the schedule table even when the electronic document has been registered, the schedule item representing the completion of document registration does not necessarily have to be specified on the schedule table in a case where the electronic document is registered.

Then, when there is another unchecked user (when yes is determined in step 180), the schedule setting unit 26 moves to step 120. In this example, because processing with respect to the pertinent users A and B is finished, the schedule setting unit 26 starts processing of another registration reminder information set including a next closer reminder submission date and time (step 110).

Further, when it is found by referencing the creator contained in the attribute information of the electronic document registered in the document registration location that the user who has not registered the electronic document by the reminder submission date and time accomplishes the task of document registration, the schedule setting unit 26 may update the schedule item specified on the schedule table. More specifically, assuming that it is found that the user A registers the report, for example, at 11:11 on Mar. 29, 2007 into the folder F, the schedule setting unit 26 may delete the item "17:00 Register Report" incorporated in a schedule entry column of Mar. 30, 2007 in the schedule table of the user A and enter a new schedule item of "11:11 Report Registered" in a schedule entry column of the document created date and time of "11:11 Mar. 29, 2007" as the schedule item representing the completion of document registration. Alternatively, the schedule setting unit 26 may only delete the schedule item "17:00 Register Report" incorporated in the schedule entry column of Mar. 30, 2007 in the schedule table for the user A without entering the new schedule item representing the completion of document registration.

It should be noted that the schedule item incorporated into the schedule table for each user by the processing according to this exemplary embodiment may be displayed in a state where display attributes, such as a brightness level, a display color, a highlight condition, character decoration, a font, or a character font size, differ from those of other schedule items, to thereby make the schedule item incorporated into the schedule table for each user according to this exemplary embodiment easily distinguished from the other schedule items. Such differentiation may be applied to the following exemplary embodiments.

Exemplary Embodiment 2

In the above-described Exemplary Embodiment 1, the example of reminding the user to accomplish the electronic document registration task has been described. In a second exemplary embodiment of the present invention, an example of reminding the user to accomplish a task of revising a registered electronic document as one form of document editing will be described.

In addition to both system and hardware configurations, basic processing functions to perform the revision task are identical to those to perform the registration task in terms of a way that it is reminded to accomplish an assigned task by a deadline. Therefore, the configurations according to Exemplary Embodiment 2 may be described as shown in FIGS. 1 and 2.

Then, it is necessary, for the revision task according to Exemplary Embodiment 2, that information regarding a reminder be previously established as in the case of the registration task. FIG. 7 shows a setting example of revision reminder information according to Exemplary Embodiment 2. The revision reminder information is data including items related to the task of revising an electronic document. In this exemplary embodiment, the reminder information registering unit 25 generates the revision reminder information according to user instructions, associates the generated revision reminder information with an electronic document to be revised, and stores them in the document storage 23. As shown in FIG. 7, the revision reminder information includes data items of the user/group name, the document title, the reminder submission date and time, and a revision deadline. The revision reminder information has a data structure basically identical to that of the registration reminder information in which the user/group name includes at least one user/group name specified as identification information of a user who takes on the task of revising an electronic document (a user who is assigned to accomplish the electronic document revision task). A name of a target document to be revised is specified in the document title. A deadline for accomplishment of the electronic document revision task is specified in the revision deadline. A date and time at which a user who has not revised the electronic document is reminded to revise the electronic document is specified in the reminder submission date and time. Processing to establish the revision reminder information in connection with the electronic document is similar to that of storing the registration reminder information in connection with the folder in Exemplary Embodiment 1, and descriptions related to the processing are not repeated. It should be noted that although the revision reminder information is described as being registered in the document storage 23 because the revision reminder information is associated with the electronic document to be revised in this exemplary embodiment, another unit may be provided to store the revision reminder information.

In addition, the reminder submission date and time may be established automatically based on the revision deadline in a manner similar to that of Exemplary Embodiment 1. However, contrasted with the registration task which can be completed by performing the task once, there are some cases where second, third, and further editions are created through revision. In other words, the revision task is not always performed only once. In this respect, it is preferable that the revision deadline is capable of accepting settings, such as, for example, "17:00 on Fridays" or "23:59 at month ends", in addition to specific dates and times. The same applies to the reminder submission date and time. In terms of the settings of the revision deadline and the reminder submission date and time in this exemplary embodiment, it is convenient for a pull-down menu to be prepared beforehand, to thereby create a revision reminder information setting screen which enables, in addition to specific input of dates and times, selection of units of time, such as a week or a month, from the pull-down menu.

Figure 8:
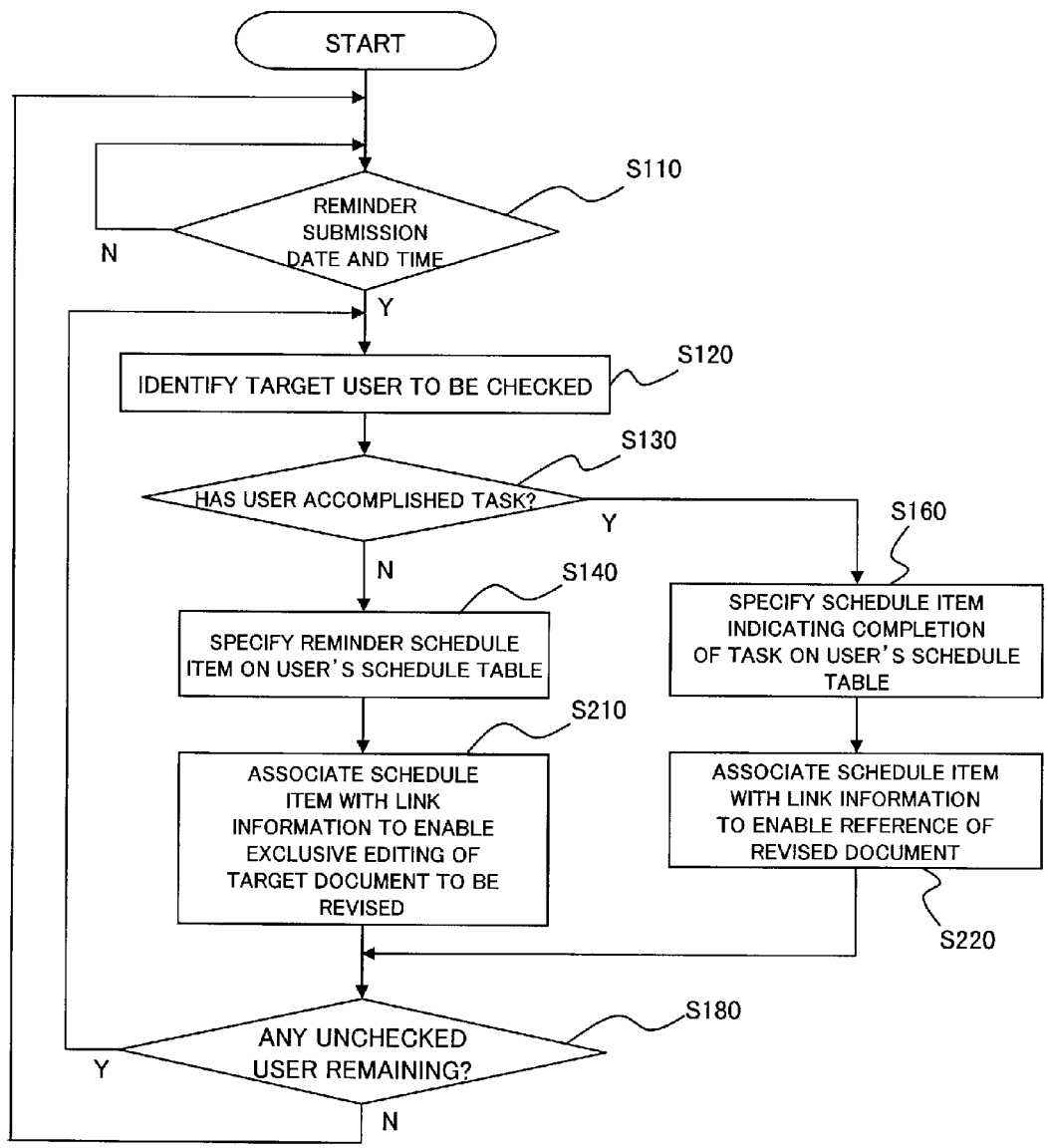
FIG. 8 is a flowchart showing an example of reminder processing for an electronic document revision task according to the second exemplary embodiment.

An exemplary flow of processing performed until the schedule table is displayed on the screen is identical to that in Exemplary Embodiment 1, and descriptions related to the processing flow are not repeated. Next, an example of a reminding process to remind a user of the electronic document revision task will be described with reference to a flowchart shown in FIG. 8. It should be noted that, in FIG. 8, process steps similar to those in Exemplary Embodiment 1 are identified by identical reference numerals to those in Exemplary Embodiment 1, and the process flow according to this Exemplary Embodiment 2 is basically the same as that of Exemplary Embodiment 1. Further, in this exemplary embodiment, the same FIG. 4A used in the description of Exemplary Embodiment 1 is also referenced for describing an example of the schedule table for the user A displayed on the screen prior to the reminder submission date and time.

The schedule setting unit 26 continuously compares the present time with the set value of the reminder submission date and time contained in each set of revision reminder information. Although it is preferable that the schedule setting unit 26 is always active, the schedule setting unit 26 may be activated, for example, at regular time intervals. Then, when the present time reaches any reminder submission date and time (when yes is determined in step 110), the schedule setting unit 26 recognizes a revision reminder information set including the reached reminder submission date ant time. According to the setting example shown in FIG. 7, when the present time reaches 15:00 Mar. 27, 2007, a revision reminder information set 53 located at the top in a record associated with a predetermined target electronic document to be revised (the "Document D" in the example of FIG. 7) is recognized. Then, users contained in the user/group name in the revision reminder information set 53 are sequentially identified as the target user to be checked (step 120). In this example, the user A is identified as the target user to be checked.

Then, the schedule setting unit 26 references attribute information of a document having the name "Document D" to find a revision operator. Here, it is assumed that the Document D is not revised by the user A (no is determined in step 130). As shown in FIG. 9, the schedule setting unit 26 specifies a schedule item 54 denoting, for example, "17:00 Revise Document D" as a schedule item for demanding document revision in a column at the date and time of "17:00 Mar. 30, 2007" corresponding to the revision deadline on the schedule table of the user A (step 140). As a result, if the user A does not revise the document even after the reminder submission date and time has passed, the schedule table on which a schedule for revising the document D is incorporated in the column at the date and time of the revision deadline is displayed on the screen as shown in FIG. 9. Further, the schedule setting unit 26 associates the incorporated schedule item 54 with link information in which it is defined that the predetermined document edit application is invoked to enable exclusive editing of the document D (step 210). Although, in the above-described example, the schedule item for demanding the document revision is specified as an item scheduled for the date and time corresponding to the revision deadline, the schedule item may be specified as an item scheduled for a date and time existing between the reminder submission date and time and the revision deadline. For example, when the user A is scheduled to have a day off on the day of the revision deadline, the schedule item may be specified as an item scheduled for the day before the revision deadline.

Then, the schedule setting unit 26 moves to step 120 when another unchecked user remains (when yes is determined in step 180). On the other hand, when there is no unchecked user (when no is determined in step 180), the schedule setting unit 26 terminates the processing of the revision reminder information and starts processing of another set of revision reminder information having a next closer reminder submission date and time (step 110).

Next, an example where the document D is revised by the user A will be described with reference to the same revision reminder information. When the document D is revised by the user A (yes is determined in step 130), data on a document revised date and time is read out from attribute information of the document D. Here, assuming that the document revised date and time is "18:33 Mar. 26, 2007", the schedule setting unit 26 specifies a schedule item 55 denoting "18:33 Document D Revised" in a column of the document revised date and time "18:33 Mar. 26, 2007" on the schedule table of the user A as a schedule item representing completion of document revision (step 160). As a result, when the user A has completed the document revision by the reminder submission date and time, the schedule table on which the schedule item representing the completion of revision of the document D is incorporated in the column of the document revised date and time is shown on the screen as illustrated in FIG. 10. It should be noted that the schedule item incorporated by the processing in step 160, which is actually a real accomplishment, is described above as the "schedule item representing the completion of revision of the document D" because the schedule item is displayed on the schedule table. Although, in the above-described example, the schedule item representing the completion of document revision is specified in the schedule table when the document D has already been revised, the schedule item representing the completion of document revision does not necessarily have to be specified on the schedule table when the document D is revised.

In addition, the schedule setting unit 26 associates the incorporated schedule item 55 with link information in which it is defined that the predetermined document edit application is invoked to enable reference of the revised electronic document or additional editing of the revised electronic document as necessary (step 220).

When it is found by referencing the revision operator contained in attribute information of the target electronic document to be revised that the document revision task is accomplished by the user who has not completed the revision task by the reminder submission date and time, the schedule setting unit 26 may update the schedule item specified on the schedule table. More specifically, when it is confirmed that the document D is revised by the user A at, for example, 11:11 on Mar. 29, 2007, the schedule setting unit 26 may delete the schedule item "17:00 Revise Document D" incorporated in the schedule entry column of Mar. 30, 2007 on the schedule table of the user A and enter a new schedule item of "11:11 Document D Revised" in a schedule entry column of the document revised date and time "11:11 Mar. 29, 2007" as the schedule item representing the completion of document revision. Because the revision task is repeatedly performed creating different versions of the document D, a revision number may be included in descriptions displayed as the schedule item to read as "Third Revision of Document D Complete" rather than the simple descriptions of "Document D Revised". Alternatively, the schedule setting unit 26 may only delete the schedule item "17:00 Revise Document D" incorporated in the schedule entry column of Mar. 30, 2007 on the schedule table of the user A without entering the new schedule item representing the completion of document revision.

It should be noted that although the example in which a single user is assigned to revise the document D by the revision deadline has been described in Exemplary Embodiment 2 as shown in FIG. 7, multiple different users may be assigned to revise the document D by the revision deadline. In order to identify a user who has revised the document D, identification information of the user who revises the document D may be stored in connection with the revised date and time of the document D when the document D is revised. Then, the user who has revised the document D may be found by referencing the stored information.

Although document registration and document revision are separately described in the respective exemplary embodiments, it is possible to configure a single system capable of handling both the document registration and the document revision.

Further, in the above-described exemplary embodiments, although an electronic document is exemplified as a target object of the registration/revision task, the object is not limited to the electronic document, and an editable electronic file, such as an image file, may be the target object to be processed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An information processing system comprising:
a file memory that stores an electronic file;
a schedule information memory that stores schedule information for each user;
a reminder information memory that stores reminder information including identification information of a user who takes on a task of registering a first electronic file into the file memory, a registration deadline of the first electronic file, and a reminder submission time at which the user who takes on the task is reminded to accomplish the task in connection with information indicating a registration location of the first electronic file in the file memory;
a confirmation unit that confirms, upon arrival of the reminder submission time, whether or not identification information of a creator of the first electronic file registered in the registration location is the identification information of the user;
a setting unit that specifies, upon arrival of the reminder submission time, and when the confirmation unit cannot confirm that the identification information of the creator of the first electronic file registered in the registration location is the identification information of the user, a schedule item for reminding the user of the task in schedule information of the user stored in the schedule information memory as an item scheduled for the registration deadline or scheduled for a day prior to the registration deadline; and
a display data outputting unit that outputs, upon receipt of a request for displaying the schedule information stored in the schedule information memory, schedule information display data in which display information corresponding to the schedule item specified by the setting unit is associated with information on a link to the registration location; and
wherein when the confirmation unit confirms that the identification information of the creator of the first electronic file registered in the registration location is the identification information of the user after the setting unit has set the schedule item for reminding the user of the task in the schedule information, the setting unit deletes or modifies the schedule item for reminding the user of the task in the schedule information of the user.

2. An information processing system comprising:
a file memory that stores an electronic file;
a schedule information memory that stores schedule information for each user;
a reminder information memory that stores reminder information including identification information of a user who takes on a task of editing the electronic file stored in the file memory, an edit deadline of the electronic file, and a reminder submission time at which the user who takes on the task is reminded to accomplish the task in connection with the electronic file;
an edit unit that enables exclusive editing of the electronic file stored in the file memory;
a confirmation unit that confirms, upon arrival of the reminder submission time, whether or not identification information of an editor who edited the first electronic file registered in the registration location is the identification information of the user;
a setting unit that specifies, upon arrival of the reminder submission time, and when the confirmation unit cannot confirm that the identification information of the editor who edited the electronic file registered in the registration location is the identification information of the user, a schedule item for reminding the user of the task in schedule information of the user stored in the schedule information memory as an item scheduled for the edit deadline or scheduled for a day prior to the edit deadline; and
a display data outputting unit that outputs, upon receipt of a request for displaying the schedule information stored in the schedule information memory, schedule information display data in which display information corresponding to the schedule item specified by the setting unit is associated with link information for causing the edit unit to enable exclusive editing of the electronic file which is a target object of the task; and
wherein when the confirmation unit confirms that the identification information of the editor who edited the first electronic file registered in the registration location is the identification information of the user after the setting unit has set the schedule item for reminding the user of the task in the schedule information, the setting unit deletes or modifies the schedule item for reminding the user of the task in the schedule information of the user.

3. A non-transitory computer-readable storage medium storing an information processing program causing a computer to execute a process comprising:
storing, in a reminder information memory, reminder information including identification information of a user who takes on a task of registering an electronic file in a file memory, a registration deadline of the first electronic file, and a reminder submission time at which the user who takes on the task is reminded to accomplish the task in connection with information indicating a registration location of the first electronic file in the file memory;
confirming, upon arrival of the reminder submission time, whether or not identification information of a creator of the first electronic file registered in the registration location is the identification information of the user;
specifying, upon arrival of the reminder submission time, and when it cannot be confirmed that the identification information of the creator of the first electronic file registered in the registration location is the identification information of the user, a schedule item for reminding the user of the task in schedule information of the user stored in the schedule information memory as an item scheduled for the registration deadline, or scheduled for a day prior to the registration deadline; and
outputting, upon receipt of a request for displaying the schedule information, schedule information display data in which display information corresponding to the specified schedule item is associated with information on a link to the registration memory; and
deleting or modifying the schedule item for reminding the user of the task in the schedule information of the user when it is confirmed that the identification information of the creator of the first electronic file registered in the registration location is the identification information of the user after the schedule item for reminding the user of the task in the schedule information has been set.

4. A non-transitory computer-readable storage medium storing an information processing program causing a computer to execute a process comprising:
storing, in a reminder information memory, reminder information including identification information of a user who takes on a task of editing an electronic file stored in a file memory, an edit deadline of the electronic file, and a reminder submission time at which the user who takes on the task is reminded to accomplish the task in connection with the electronic file;
confirming, upon arrival of the reminder submission time, whether or not identification information of an editor who edited the first electronic file registered in the registration location is the identification information of the user;
specifying, upon arrival of the reminder submission time, and when it cannot be confirmed that the identification information of the editor who edited the first electronic file registered in the registration location is the identification information of the user, a schedule item for reminding the user of the task in schedule information of the user stored in the schedule information memory as an item scheduled for the edit deadline or scheduled for a day prior to the edit deadline;
outputting, upon receipt of a request for displaying the schedule information stored in the schedule information memory, schedule information display data in which display information corresponding to the schedule item specified by the setting unit is associated with link information for causing the edit unit to enable exclusive editing of the electronic file which is a target object of the task; and
deleting or modifying the schedule item for reminding the user of the task in the schedule information of the user when it is confirmed that the identification information of the editor who edited the first electronic file registered in the registration location is the identification information of the user after the schedule item for reminding the user of the task in the schedule information has been set.

* * * * *